(12) United States Patent
Sato

(10) Patent No.: US 9,979,857 B2
(45) Date of Patent: May 22, 2018

(54) IMAGE READER ACQUIRING BLACK DATA AND WHITE DATA FOR SHADING CORRECTION WHEN COVER IS IN OPEN STATE

(71) Applicant: BROTHER KOGYO KABUSHIKI KAISHA, Nagoya, Aichi (JP)

(72) Inventor: Seiya Sato, Mie-ken (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days. days.

(21) Appl. No.: 15/399,860

(22) Filed: Jan. 6, 2017

(65) Prior Publication Data
US 2017/0208209 A1    Jul. 20, 2017

(30) Foreign Application Priority Data

Jan. 15, 2016 (JP) .................................. 2016-005880

(51) Int. Cl.
*H04N 1/407* (2006.01)
*H04N 1/401* (2006.01)
(Continued)

(52) U.S. Cl.
CPC ....... *H04N 1/4076* (2013.01); *H04N 1/00013* (2013.01); *H04N 1/00034* (2013.01); *H04N 1/00068* (2013.01); *H04N 1/00082* (2013.01); *H04N 1/00803* (2013.01); *H04N 1/125* (2013.01); *H04N 1/401* (2013.01); *H04N 2201/0081* (2013.01)

(58) Field of Classification Search
CPC .... H04N 1/407–1/4078; H04N 1/6027; H04N 1/00013; H04N 1/00034; H04N 1/00068; H04N 1/00082; H04N 1/00551
See application file for complete search history.

(56) References Cited

U.S. PATENT DOCUMENTS 7,453,055 B2 * 11/2008 Susaki ................... H04N 1/401
250/208.1
8,587,834 B2 * 11/2013 Shimokawa ........... H04N 1/401
358/2.1
(Continued)

FOREIGN PATENT DOCUMENTS

JP     2000-151919 A    5/2000
JP     2001-077990 A    3/2001
(Continued)

*Primary Examiner* — Scott A Rogers
(74) *Attorney, Agent, or Firm* — Scully, Scott, Murphy & Presser, PC

(57) ABSTRACT

In an image reader, a controller acquires a set of first black data for each pixel in a line by reading one line worth of image via a light receiver with a light source being turned off when a detector detects that a cover is in an open state. Subsequently, the controller acquires a set of white data for the each pixel in the line by reading a white reference member via the light receiver with the light source emitting light when the detector detects that the cover is in the open state. The controller calculates a set of correction data for the each pixel in the line by subtracting the set of first black data of the each pixel from the set of first white data of the each pixel. The set of correction data is used in a shading correction.

9 Claims, 10 Drawing Sheets

(51) Int. Cl.
  *H04N 1/00*  (2006.01)
  *H04N 1/12*  (2006.01)

(56) References Cited

U.S. PATENT DOCUMENTS

| | | | | |
|---|---|---|---|---|
| 9,143,647 B2* | 9/2015 | Shimizu | | H04N 1/00896 |
| 9,565,329 B2* | 2/2017 | Yamada | | H04N 1/053 |
| 9,723,164 B2* | 8/2017 | Misaka | | H04N 1/00708 |
| 9,832,332 B2* | 11/2017 | Sunako | | H04N 1/00689 |
| 9,838,553 B2* | 12/2017 | Yamada | | H04N 1/00551 |
| 2006/0061834 A1 | 3/2006 | Nonaka | | |
| 2008/0278774 A1 | 11/2008 | Enami et al. | | |
| 2016/0021270 A1* | 1/2016 | Misaka | | H04N 1/00708 |
| | | | | 358/461 |

FOREIGN PATENT DOCUMENTS

| | | |
|---|---|---|
| JP | 2006-087008 A | 3/2006 |
| JP | 2008-306707 A | 12/2008 |

* cited by examiner

| REFERENCE DATA | COVER STATE FLAG CFG |
|---|---|
| FIRST BLACK DATA BK1 | 1 or 0 |
| FIRST WHITE DATA WH1 | 1 or 0 |
| SECOND WHITE DATA WH2 | 1 or 0 |
| SECOND BLACK DATA BK2 | 1 or 0 |

1: COVER CV IS IN THE OPEN STATE
0: COVER CV IS IN THE CLOSED STATE

DATA REACQUISITION PROCESS (R7 OR R12)

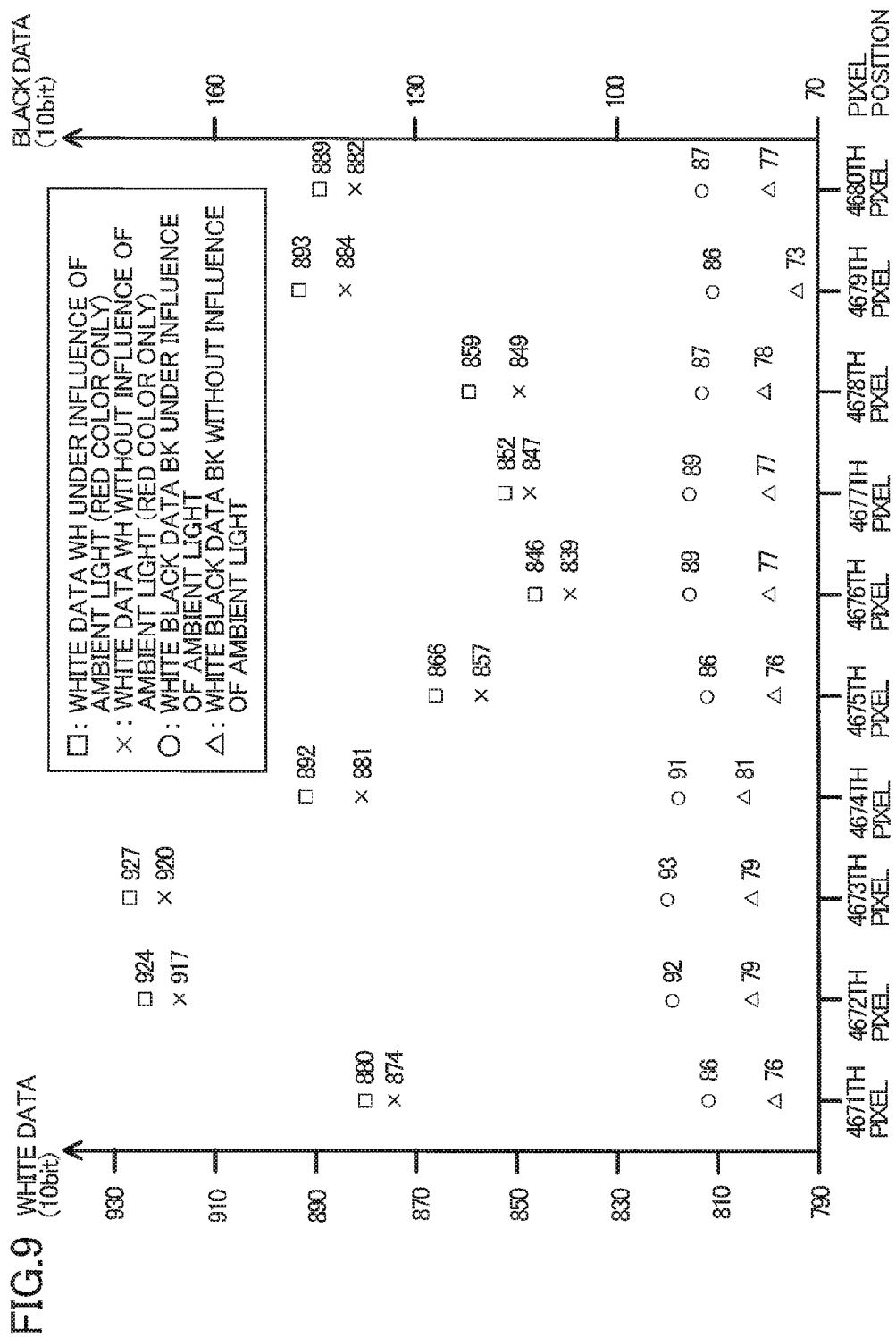

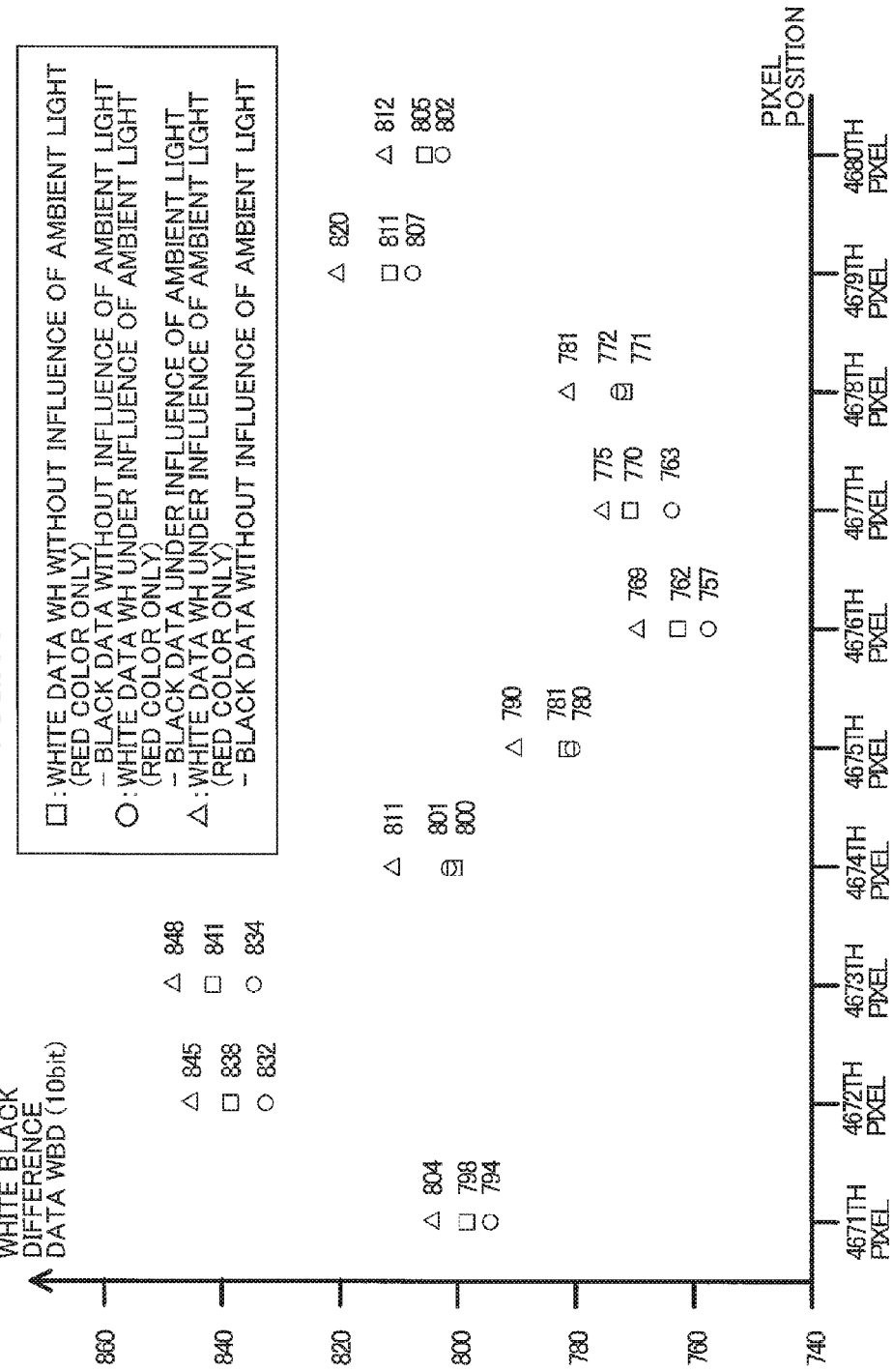

IMAGE READER ACQUIRING BLACK DATA AND WHITE DATA FOR SHADING CORRECTION WHEN COVER IS IN OPEN STATE

CROSS REFERENCE TO RELATED APPLICATION

This application claims priority from Japanese Patent Application No. 2016-005880 filed Jan. 15, 2016. The entire content of the priority application is incorporated herein by reference.

TECHNICAL FIELD

The present disclosure relates to an image reader.

BACKGROUND

A conventional image reader, which reads an image of a document sheet placed on a platen, detects an open or closed state of a document cover. The image reader performs a reading preparation operation based on the detected result before a reading start instruction is issued, thereby causing reduction of a time period from a timing when the reading start instruction is received to a timing when an actual reading operation is started.

One such a conventional image reader reads a reference white plate in response to a detected closed state of a document cover, and calculates data for shading correction on the basis of white data acquired using the read result.

Japanese Patent Application Publication No. 2001-77990 discloses another image reader that detects white data and black data in response to a detected open state of a document cover, and determines whether the detected black data and white data are influenced by light from outside of the image reader (hereinafter, referred to as ambient light). When there is no influence of the ambient light on the detected black data and the detected white data, the image reader reads an image of a document sheet by using the detected black data and the detected white data. When the detected black data and the detected white data are influenced by the ambient light, previous black data and previous white data, which were previously used on the basis of a previous reading start instruction, are used for current reading of the image of the document sheet.

SUMMARY

It may be conceivable to combine the techniques of the two image readers described above. That is, it may be conceivable that detected the black data and the detected white data as disclosed in Japanese Patent Application Publication No. 2001-77990 are used for calculation for the shading correction. In this conceivable case, when it is determined that the detected black data and white data are influenced by the ambient light, the previous black data and the previous white data may be used for calculation for the shading correction. However, using the previous black data and the previous white data for calculation under a current reading state may result in improper shading correction.

In view of the foregoing, it is an object of the present disclosure to provide an image reader capable of calculation for shading correction by using black data and white data so that influence of ambient light is reduced in the data for shading correction.

In order to attain the above and other objects, the disclosure provides an image reader. The image reader includes a reading section, a cover, a correction section, a white reference member, a detector, and a controller. The reading section has a light source and a light receiver. The light receiver includes a plurality of light receiving elements arranged in a line extending in a main scanning direction, the plurality of light receiving elements respectively corresponding to a plurality of pixels arranged in the line. The light receiver is configured to read an image piece for the line while the light source emitting light onto a document sheet. The reading section is configured to output a value of each pixel. The value indicates a result of reading the image piece for the line. The cover is configured to change between a closed state in which the cover covers the reading section and an open state in which the cover does not cover the receiving section. The correction section is configured to perform a shading correction on the value of the each pixel outputted from the reading section. The white reference member has a white reference density as a reference of white for the reading section. The detector is configured to detect whether the cover is in the closed state or the open state. The controller is configured to: a) acquire a set of first black data for each pixel in the line by reading one line worth of image via the light receiver with the light source being turned off when the detector detects that the cover is in the open state; b) acquire, after execution of the acquire a), a set of white data for the each pixel in the line by reading the white reference member via the light receiver with the light source emitting light when the detector detects that the cover is in the open state; and c) calculate a set of correction data for the each pixel in the line by subtracting the set of first black data of the each pixel from the set of first white data of the each pixel, where the set of correction data is used in the shading correction.

According to another aspects, the disclosure provides an image reader. The image reader includes a reading section, a cover, a white reference member, a cover detector, an image processor, a memory, and a controller. The reading section has a light source and a light receiver. The light receiver includes a plurality of light receiving elements arranged in a line extending in a main scanning direction. Each light receiving element is configured to output a value based on received light. The cover is movable between a closed state and an open state. The cover detector is configured to detect whether the cover is in the closed state or the open state. The image processor has shading correction function. The controller is configured to: a) while the cover detector detects that the cover is in the open state, receive a first black value from each light receiving element without emitting light from the light source; b) determine a set of first black data for each light receiving element based on the received first black value received from the each light receiving element; c) after determining the set of first black data, receive first white value from each light receiving element while emitting light from the light source at a first position and while the cover detector detects that the cover is in the open state; d) determine a set of first white data for each light receiving element based on the received first white value from each light receiving element; e) determine a set of correction data for each light receiving element by subtracting the set of first black data of the each light receiving element from the set of first white data of the each light receiving element; and f) control the image processor to perform the shading correction function using the set of correction data.

BRIEF DESCRIPTION OF THE DRAWINGS

The particular features and advantages of the disclosure as well as other objects will become apparent from the following description taken in connection with the accompanying drawings, in which:

FIG. 9 is a graph illustrating white data and black data in a case where there is influence of the ambient light and a case where there is no influence of the ambient light; and FIG. 10 is a graph illustrating white black difference data in the case where there is influence of the ambient light and the case where there is no influence of the ambient light.

DETAILED DESCRIPTION

Structure of Image Reader SM

Figure 1:
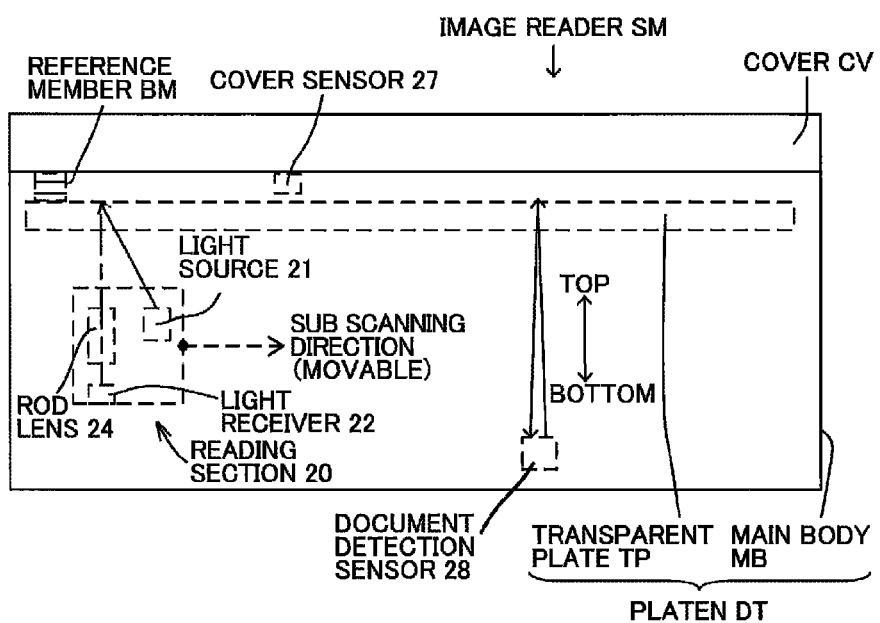
FIG. 1 is a front view of an image reader according to an embodiment.
Figure 2:
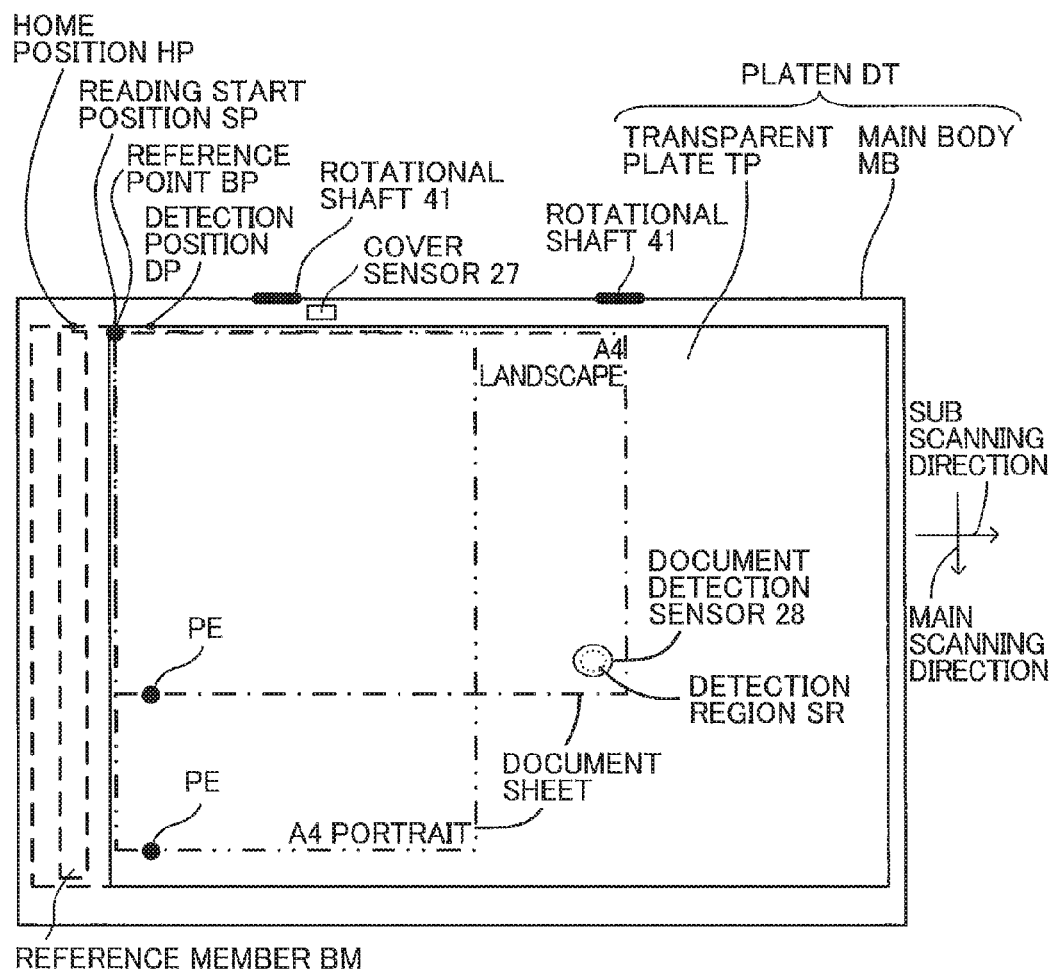
FIG. 2 is a top view of a platen according to the embodiment.

FIG. 1 is a front view of an image reader SM according to an embodiment. FIG. 2 is a top view of a platen DT. In the following descriptions, a lower direction of FIG. 2 indicates a downstream side of a main scanning direction, a right direction of FIGS. 1 and 2 indicates a downstream side of a sub scanning direction orthogonal to the main scanning direction. The image reader SM includes the platen DT, and a cover CV. The platen DT includes a main body MB and a transparent plate TP. The main body MB is a casing for accommodating various members such as the transparent plate TP and a reading section 20. The transparent plate TP is fixedly accommodated in the main body MB. A document sheet is placed on the transparent plate TP. The cover CV is arranged above the main body MB and is capable of moving between an open position and a closed position. The cover CV does not cover the main body MB at the open position. The cover CV covers the main body MB at the closed position. The cover CV has a rotational axis 41 at a far side of the main body MB (a far side with respect to an orthogonal direction of FIG. 1, or a upper side of FIG. 2). A near side of the cover CV moves upward to open the main body MB when the cover CV is rotated about the rotational axis 41. Here, the near side is a near side with respect to the orthogonal direction of FIG. 1, or a lower side of FIG. 2.

The image reader SM further includes the reading section 20 and a document detection sensor 28. The reading section 20 is accommodated in the main body MB below the transparent plate TP. The reading section 20 is movable relative to the main body MB in the sub-scanning direction (that is, the left and right direction of FIG. 1). The reading section 20 reads the documents sheet placed on the transparent plate TP. The reading section 20 may be a contact image sensor (CIS). Specifically, the reading section 20 includes a light source 21, a rod lens 24, and a light receiver 22. The light source 21 includes light emitting diodes (LEDs) for red, blue, and green and irradiates light toward the transparent plate TP. The rod lens 24 receives reflected light originally irradiated from the light source 21. The document detection sensor 28 is located at a position as shown in FIGS. 1 and 2 so that the document detection sensor 28 is capable of detecting an A4 size document sheet placed in a landscape posture (or lateral arrangement, see one dot chain line in FIG. 2) on the transparent plate TP and is incapable of detecting the A4 size document placed in a portrait posture (or longitudinal arrangement, see two-dot chain line in FIG. 2) on the transparent plate TP. Here, when the A4 size document sheet is placed in the landscape posture on the transparent plate TP, the longitudinal side of the document sheet extends in the sub scanning direction. When the A4 size document sheet is placed in the portrait posture in the transparent plate TP, the longitudinal side of the document sheet extends in the main scanning direction. The document detection sensor 28 includes a light emitting portion (not shown) and is located at a position neighboring a bottom of the main body MB. A light path concerning the reading section 20 is a path of light transmitted from the light source 21, reflected by the transparent plate TP (or, the document sheet or the cover CV), and received by the light receiver 22. A length of the light path (or optical length) for light transmitted from the reading section 20 (hereinafter, referred to as a first length) is a distance of the light transmitted from the light source 21 and received by the light receiver 22 through the light path concerning the reading section 20. A light path concerning the document detection sensor 28 is a path of light transmitted from the document detection sensor 28, reflected by the transparent plate TP (or, the document sheet or the cover CV), and received by the document detection sensor 28. The length of the light path (or optical length) of the document detection sensor 28 (hereinafter, referred to as a second length) is a distance of the light transmitted from and received by the document detection sensor 28 through the light path concerning the document detection sensor 28. The document detection sensor 28 is configured (or arranged) so that the second length is longer than the first length. The document detection sensor 28 is capable of detecting existence or absence of the document sheet on a detection region SR of the transparent plate TP as encircled by a broken line of FIG. 2.

The light receiver 22 includes a plurality of photoelectric conversion elements 23 arranged in the main scanning direction, and has a built-in shift register (not shown) and a built-in amplifier (not shown). The plurality of photoelectric conversion elements 23 respectively corresponds to a plurality of pixels. That is, the plurality of pixels is arranged in a line extending in the main scanning direction. Output of each photoelectric conversion element 23 indicates an amount of received light a corresponding pixel. A first pixel among the plurality of pixels is located at a top side of FIG. 2, that is, at an end position of a side of a reference point BP (described later). A last pixel is located at a bottom side of FIG. 2, that is, at an end of a side opposite to the reference point BP. In other words, the first pixel is located at upstream end in the main scanning direction whereas the last pixel is located at downstream end in the main scanning direction. In the embodiment, one line is configured of the plurality of pixels from the first pixel to the last pixel.

A top surface of the platen DT includes a top surface of the main body MB and a partial region of a top surface of the transparent plate TP exposed to the cover CV (hereinafter, referred to as the cover side region). The cover side region of the transparent plate TP is drawn by solid line in FIG. 2. A cover sensor 27, and two rotational shafts 41 are arranged in the main body MB. The transparent plate TP has a rectangle shape including a longitudinal side extending in the sub scanning direction and a short side extending in the main scanning direction. The reference point BP is located at an upstream end in the main scanning direction of the cover side region and an upstream end in the sub scanning direction of the cover side region. A document sheet is placed on the transparent plate TP on the basis of the reference point BP as a cardinal point. That is, the document sheet is placed on the transparent plate TP so that a corner of the document sheet is on the reference point BP. The transparent plate TP includes a document region for placing the document sheet. The document region extends toward downstream side of the main scanning direction and downstream side of the sub scanning direction from the reference point BP. For example, the document region is a region drawn by the one dot chain line shown in FIG. 2 when an A4 size document sheet is placed on the transparent plate TP in the landscape posture. Or, the document region is a region drawn by the two-dot chain line shown in FIG. 2 when an A4 size document sheet is placed on the transparent plate TP in the portrait posture. The cover CV is rotated between the open position and the closed position about the two rotational shafts 41 The two rotational shafts 41 are arranged at an upstream side of the main body MB in the main scanning direction. The cover sensor 27 is located at vicinity of the rotational shaft 41. The cover sensor 27 is ON (or outputs on-signal) when the cover CV is in an open state. The cover sensor 27 is OFF (or outputs off-signal) when the cover CV is in a closed state. Here, the open state of the cover CV indicates that the cover CV opens and the closed state of the cover CV indicates that the cover CV is closed. When the cover CV is at a sensor detection position SDP, the cover sensor 27 detects that the cover CV is changed from the open state to the closed state. When the cover is the sensor detection position SDP, the cover CV forms an angle of 3° with the main body MB. The sensor detection position SDP is a position where ambient light from periphery of the main body MB influences on neither the reading section 20 nor the document detection sensor 28. The reading section 20 does not detect a surface of the cover CV facing the reading section 20 when the cover CV is at the sensor detection position SDP.

The image reader SM further includes a reference member BM fixed to the top surface of the transparent plate TP, specifically fixed to a top surface of a region drawn by a dotted line in FIG. 2 that is outside of the cover side region. The reference member BM is located on upstream end portion of the transparent plate TP in the sub scanning direction, that is, left side of FIG. 2. The reference member BM is located left side of the reference point BP. The reference member BM is a white member extending in the main scanning direction. The reference member BM is used when first white data WH1, second white data WH2, and fourth white data WH4 described later are acquired or when the light source 21 is adjusted. The reference member BM is a width (a length in the sub scanning direction) of 10 mm. A home position HP is defined as a center position of the reference member BM in the sub scanning direction. The reading section 20 is movable in the sub scanning direction based on the home position HP as a reference. A detection position DP is defined as a reading position at which the reading section 20 is positioned when a document size determination process (described later) is performed. Specifically, the detection position DP is a position in the sub scanning direction at which the reading section 20 is positioned when the reading section 20 detects a length of the document sheet, which is placed on the platen DT, in the main scanning direction. The detection position DP is separated from the reference point BP toward downstream side of the reference point BP in the sub scanning direction by 10 mm. A reading start position SP is defined as a position in the sub scanning direction at which the reading section 20 is positioned when the reading process starts. The reading start position SP is a position in the sub scanning direction matching the reference point BP in the sub scanning direction.

Electrical Configuration of Image Reader SM

Figure 3:
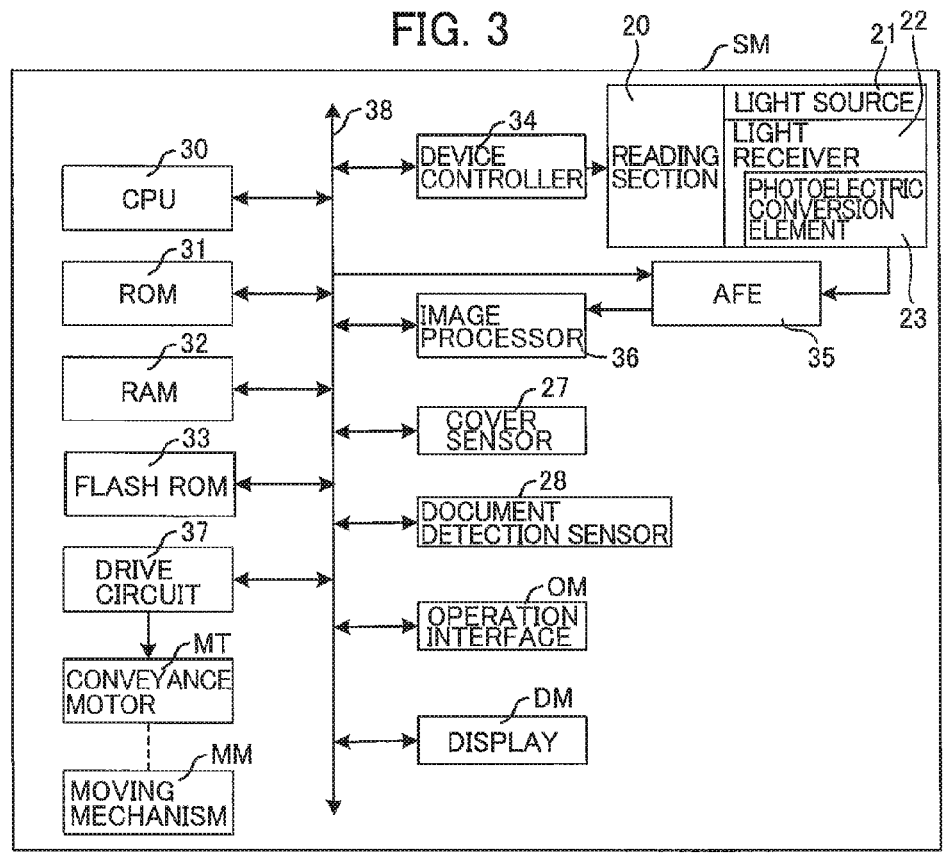
FIG. 3 is a block diagram illustrating electrical configurations of the image reader and a structure of data in a RAM.

Electrical configuration of the image reader SM will be explained with reference to FIG. 3. The image reader SM includes a CPU 30, a ROM 31, a RAM 32, a flash ROM 33, a device controller 34, an Analogue Front End (AFE) 35, an image processor 36, a drive circuit 37, an operation interface OM, a display DM, the cover sensor 27, and the document detection sensor 28. The elements 30-37 are connected to the operation interface OM, the display DM, the cover sensor 27, and the document detection sensor 28 via a bus. The operation interface OM includes a plurality of keys, such as a start button and a determination button. The user can input various instructions to the operation interface OM by operating thereof. The display DM is for displaying various information.

The ROM 31 stores various programs for executing processes for operating the image reader SM, such as, a main reading process and subroutines in each main process. The CPU 30 controls each section of the image reader SM according to a program read from the ROM 31. The flash ROM 33 is a nonvolatile memory capable of storing data and outputting the data therein. The flash ROM 33 stores various types of data generated in a control process executed by the CPU 30, such as, data acquired in the main reading process. The RAM 32 temporarily stores arithmetic results acquired in the control process executed by the CPU 30. In the embodiment, the RAM 32 stores cover state flags CFG, and reference data, such as first black data BK1, the first white data WH1, second white data WH2, second black data BK2 in association with the respective cover state flags CFG.

The device controller 34 is connected to the reading section 20. The device controller 34 transmits to the light source 21 signal for controlling the light source 21 to turn on or off, and signal for controlling current value flowing in the light source 21, according to instructions from the CPU 30. The device controller 34 transmits to the light receiver 22 serial-in signal for transferring electric signals from the plurality of photoelectric conversion elements 23 to the shift register (not shown) at a time, and clock signal for sequentially outputting electric signals from the shift register, according to instructions from the CPU 30. When the reading section 20 receives the above described signals from the device controller 34, the reading section 20 turns on the light source 21, and outputs analog signal to the AFE 35 on the basis of an amount of light received in the light receiver 22.

The AFE 35 is connected to the reading section 20. The AFE 35 converts analog signal outputted from the reading section 20 to digital data according to instructions from the CPU 30. The AFE 35 has a predetermined input range and a predetermined resolution. For example, when the resolution is 10 bit, the data is represented by one of gradation levels from "0" to "1023". In this case, the AFE 35 converts the analog signal transmitted from the reading section 20 to gradation data of 10 bit (0-1023) as the digital data. The digital data generated by the AFE 35 transmitted to the image processor 36. An offset adjustment value and a gain adjustment value are set to the AFE 35. The offset adjustment value is for offset-adjusting analog signal transmitted from the reading section 20. The gain adjustment value is for performing gain adjustment on the offset-adjusted analog signal. The AFE 35 converts the offset-adjusted and gain-adjusted analog signal to the digital data.

The image processor 36 is configured of ASIC (Application Specific Integrated Circuit) dedicated for image processes, and performs various image processes on the digital data. The image processes are, for example, correction processes such as shading correction and gamma correction. The image processor 36 is set settings whether each process is performed. So, the image processor 36 can be set so that none of image processes is performed or all the image processes are performed. The image processor 36 performs each set process on the digital data and generates digital image data. The generated digital image data is stored in the RAM 32 transmitted via the bus 38. The shading correction includes white correction and black correction. Black correction data and white correction data are set inside the image processor 36. The black correction data and the white correction data are for the black correction and the white correction respectively. For example, when the image processor 36 is set so that the gamma correction is not performed and the shading correction is performed, the image processor 36 performs the black correction on the digital data according to the set black correction data and performs the white correction on the black corrected digital data according to the set white correction data to generate the digital image data.

The drive circuit 37 is connected to a conveyance motor MT. The conveyance motor MT is connected to a moving mechanism MM. The drive circuit 37 drives the conveyance motor MT on the basis of a drive instruction transmitted from the CPU 30. The drive circuit 37 controls the conveyance motor MT to rotate in an instructed rotation amount in an instructed rotational direction according to the drive instruction. When the conveyance motor MT rotates in a prescribed rotation amount, the moving mechanism MM rotates a prescribed angle, and the reading section 20 is moved a prescribed distance in the sub scanning direction.

Operations

Operations of the image reader SM will be explained while referring to FIGS. 4-7. The image reader SM performs the main reading process for reading the document sheet. The CPU 30 performs processes R1-R14 in the main reading process and processes in subroutines.

Main Reading Process

Figure 4:
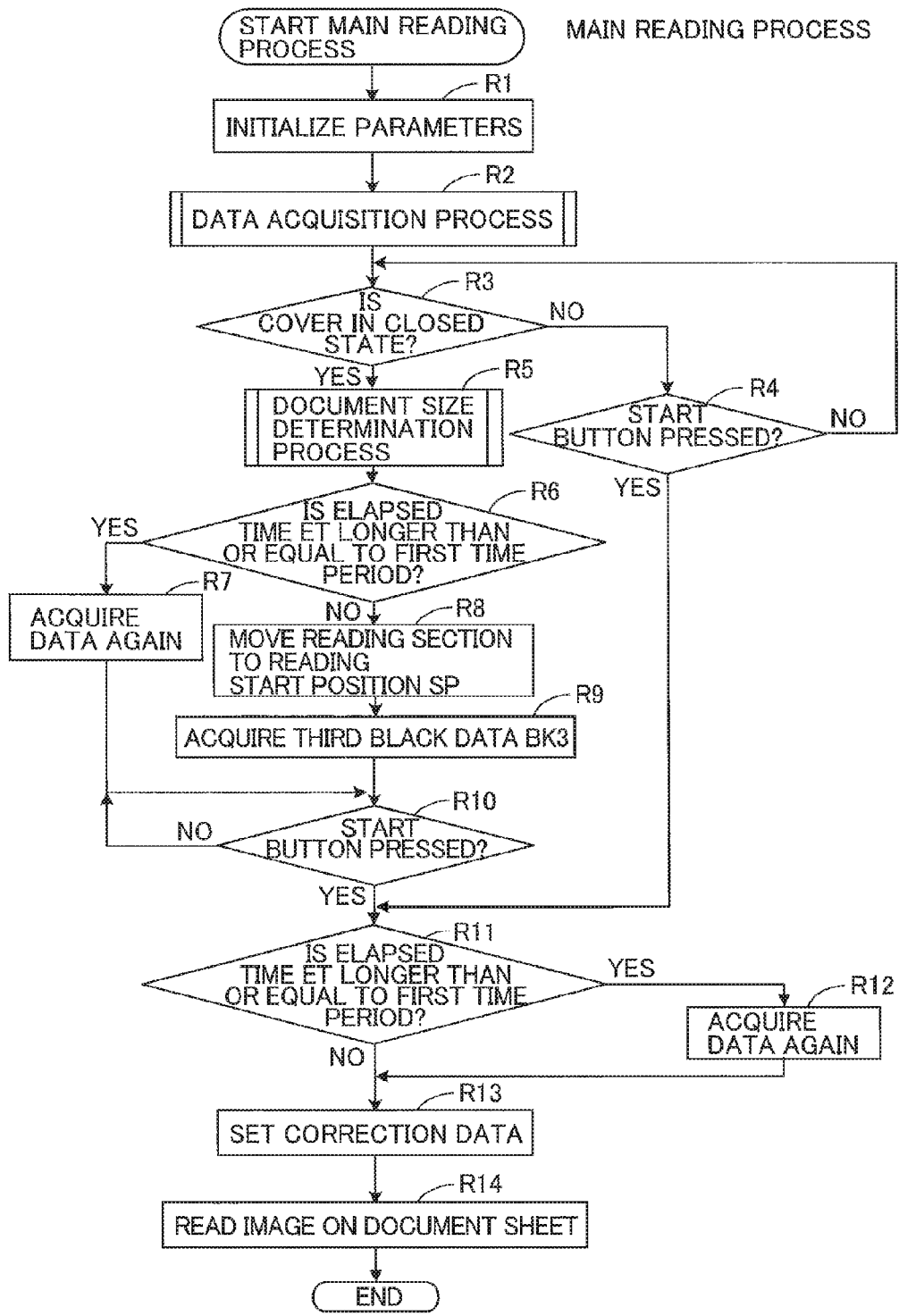
FIG. 4 is a flowchart illustrating a main reading process according to the embodiment.

The main reading process shown in FIG. 4 is started when the user opens the cover CV. That is, the CPU 30 starts the main reading process when the cover sensor 27 is ON. In the embodiment, 600 dpi is set as a reading resolution of the main reading process and color mode is set in the main reading process. Note that when the cover CV is opened again during execution of the main reading process, the main reading process is restarted from the beginning.

When the main reading process is started, in R1 the CPU 30 moves the reading section 20 to the home position HP via the drive circuit 37, subsequently initializes the device controller 34, the AFE 35, and image processor 36, and starts counting a cover detection time CT from a value "0". Specifically, the CPU 30 transmits a drive instruction to the drive circuit 37 for moving the reading section 20 so that the reading position of the reading section 20 matches the home position HP. The CPU 30 acquires settings for clock signal and serial-in signal depending on the reading resolution of 600 dpi from the flash ROM 33 and sets the device controller 34 on the basis of the acquired settings. The CPU 30 acquires the offset adjustment value and the gain adjustment value of the AFE 35 from the flash ROM 33 and sets the AFE 35 on the basis of the acquired values. The CPU 30 does not perform any image process in the processes R2-R4, and R6-R12. The CPU 30 starts counting the cover detection time CT from the value "0".

In R2 the CPU 30 performs a data acquisition process for acquiring each data of the reading section 20 after the cover CV opens. The CPU 30 starts a document detection process in which the document detection sensor 28 detects the document sheet every 50 ms (milliseconds). The CPU 30 acquires the first black data BK1, the first white data WH1, the second white data WH2, and the second black data BK2 as the reference data. The CPU 30 counts an elapsed time ET from a value "0", and calculates first white black difference data WBD1, and stores the calculated first white black difference data WBD1 in the flash ROM 33 as final white black difference data RWBD. The CPU 30 moves the reading section 20 to the detection position DP by using the drive circuit 37. Details of the data acquisition process will be described later.

In R3 the CPU 30 determines whether the cover CV is in the closed state. Specifically, when the cover sensor 27 is OFF, the CPU 30 determines that the cover CV is in the closed state (R3: YES), stops counting the cover detection time CT, and proceeds to R5. When the cover sensor 27 is ON, the CPU 30 determines that the cover CV is in the open state (R3: NO), then proceeds to R4.

When the cover CV is determined to be in the open state (R3: NO), in R4 the CPU 30 determines whether the start button of the operation interface OM is pressed. When the CPU 30 determines that the start button is pressed (R4: YES), the CPU 30 moves the reading section 20 to the reading start position SP via the drive circuit 37, sets a document size PS of the document sheet on the platen DT to a maximum reading range, and proceeds to R11. When the CPU 30 determines that the start button of the operation interface OM does not pressed (R4: NO), the CPU 30 returns to R3.

When the cover CV is in the closed state (R3: YES), in R5 the CPU 30 performs a document size determination process for determining the document size PS of the document sheet on the platen DT. Specifically, the CPU 30 controls the reading section 20 to read the document sheet at the detection position DP to detect a document end PE indicating an end of the document sheet in the main scanning direction. The CPU 30 determines a document state PA specifying presence or absence of the document sheet on the detection region SR on the basis of detection data VDD. The CPU 30 finally determines the document size PS on the basis of the document end PE and the document state PA. In this process (R5), the CPU 30 sets the image processor 36 so as to perform the shading correction but not to perform the gamma correction. The CPU 30 sets the image processor 36 so that none of the image processes is performed after completing this process (R5).

In R6 the CPU 30 determines whether the elapsed time ET is longer than or equal to a prescribed first time period. Specifically, when the elapsed time ET is longer than or equal to the first prescribed time (R6: YES), the CPU 30 proceeds to R7. When the elapsed time ET is shorter than the prescribed first time period (R6: NO), the CPU 30 proceeds to R8. The first prescribed time is one minute for example. This is because environment such as temperature around the image reader SM will be changed and the reference data may not correspond to the changed environment after one minute passes.

When the elapsed time ET is longer than or equal to the prescribed first time period (R6: YES), in R7 the CPU 30 performs a data reacquisition process for acquiring each data of the reading section 20 again. The CPU 30 moves the reading section 20 to the home position HP by using the drive circuit 37. The CPU 30 acquires, as reference data, fourth black data BK4 and the fourth white data WH4. The CPU 30 calculates fourth white black difference data WBD4. The CPU 30 resets the elapsed time ET to a value "0", and starts count the elapsed time ET from the value "0" again. The CPU 30 stores the fourth white black difference data WBD4 as the final white black difference data RWBD in the flash ROM 33. The CPU 30 moves the reading section 20 to the reading start position SP by using the drive circuit 37. After completing R7, the CPU 30 proceeds to R10. Details of the data reacquisition process R7 will be explained while referring to FIG. 7.

When the elapsed time ET is shorter than the prescribed first time period (R6: NO), in R8 the CPU 30 moves the reading section 20 to the reading start position SP by using the drive circuit 37. Specifically, the CPU 30 transmits a drive instruction to the drive circuit 37 for moving the reading section 20 so that the reading position of the reading section 20 matches the reading start position SP.

In R9 the CPU 30 acquires third black data BK3 of the reading section 20 as the reference data. Specifically, the CPU 30 turns off the light source 21, and controls the reading section 20 to read the document sheet or the cover CV. The CPU 30 acquires digital image data of one color for each pixel in one line as the third black data BK3. The third black data BK3 is acquired while the light source 21 is turned off for each color, and thus the third black data BK3 is monochromatic data (data for a single color).

In R10 the CPU 30 determines whether the start button of the operation interface OM is pressed. When the start button of the operation interface OM is pressed (R10: YES), the CPU 30 proceeds to R11. When the start button is not pressed (R10: NO), the CPU 30 waits until the start button is pressed.

In R11 the CPU 30 determines whether the elapsed time ET is longer than or equal to the prescribed first time period. Specifically, when the elapsed time ET is longer than or equal to the first prescribed time period (R11: YES), the CPU 30 proceeds to R12. In R12 the CPU 30 acquires each data again similarly to R7. The process R12 is the same as the process R7 and thus detailed descriptions thereof will be explained later. After completing the process R12, the CPU proceeds to R13. When the elapsed time ET is shorter than the prescribed first time period (R11: NO), the CPU 30 proceeds to R13.

In R13 the CPU 30 makes settings of the image processor 36 by using the white correction data and the black correction data. Specifically, when the fourth white black difference data WBD4 is stored as the final white black difference data RWBD in the flash ROM 33, the CPU 30 makes settings of the image processor 36 by using the fourth white black difference data WBD4 as the white correction data and using the fourth black data BK4 as the black correction data.

When the first white black difference data WBD1 is stored as the final white black difference data RWBD in the flash ROM 33, the CPU 30 determines whether count of the cover detection time CT is continued. When the count of the cover detection time CT is continued, the CPU 30 makes settings of the image processor 36 by using first white black difference data WBD1 as the white correction data and using first black data BK1 as the black correction data. Because the first black data BK1 is set as the black correction data, the first black data BK1 is latest black data at a timing of R13, thereby performing a black correction process reflecting latest state of the reading section 20 in a subsequent reading process R14. When the count of the cover detection time CT is stopped, the CPU 30 makes settings of the image processor 36 by using the first white black difference data WBD1 as the white correction data and using the third black data BK3 as the black correction data.

The CPU 30 further makes settings of the image processor 36 by using the setting value indicating that all the image processes are performed.

In R14, the CPU 30 reads an image on the document sheet. Specifically, the CPU 30 transmits an instruction to the drive circuit 37 for moving the reading section 20 and controls the light source 21 to irradiate light at an intensity ST to read the image of the document sheet in the document size PS. The CPU 30 controls the image processor 36 to perform the black correction on a pixel read value for each pixel using the black data of the corresponding pixel, and further perform the white correction on the black-correction-performed pixel value of the each pixel using the white data of the corresponding pixel. The CPU 30 generates image data including the black and white corrected pixel values for each pixel. The read image data is stored in the RAM 32 in order to be printed by a printer (not shown) or be outputted to an external apparatus as image data.

Acquisition Process R2 when the Cover CV Opens

Figure 5:
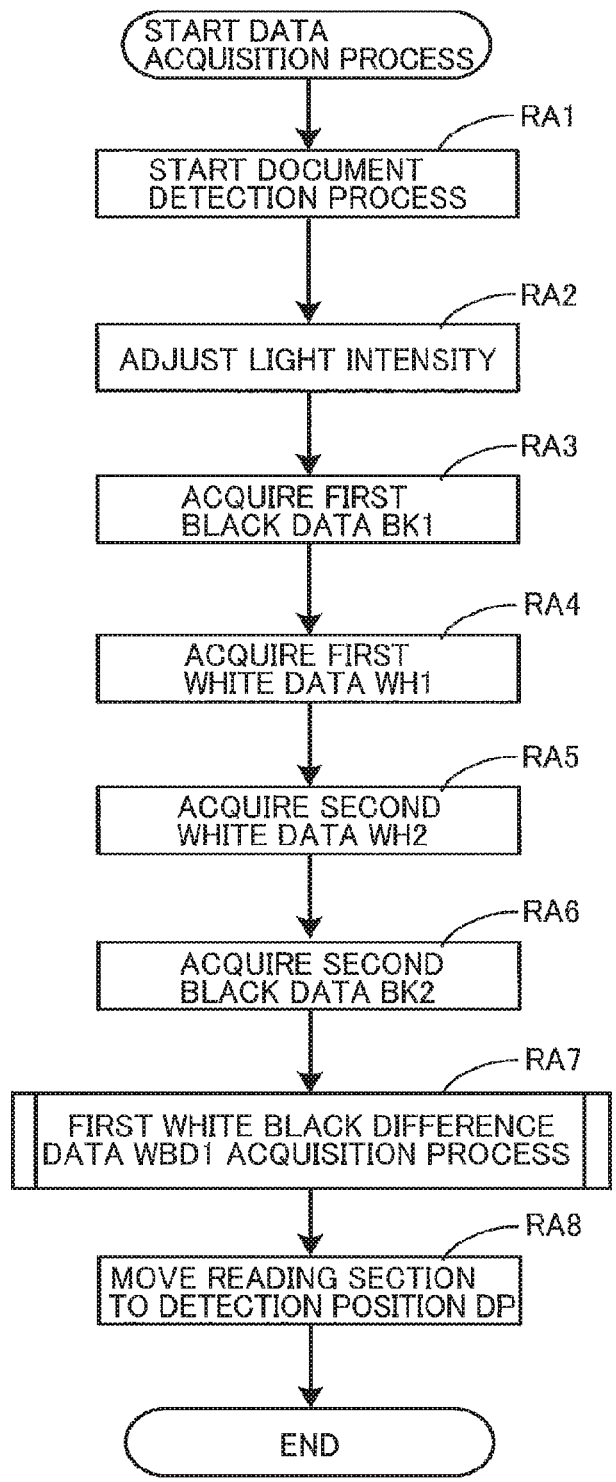
FIG. 5 is a flowchart illustrating a data acquisition process according to the embodiment.

When the acquisition process R2 is started, in RA1 of FIG. 5 the CPU 30 performs a document detection process in which the document detection sensor 28 detects presence of the document sheet or absence of the document sheet on the detection region SR. The document detection process is performed in parallel to processes (RA2, RA3, and so on) subsequent to RA1.

When the document detection process is started in RA1, the CPU 30 controls the document detection sensor 28 to detect presence or absence of the document sheet on the detection region SR every 50 ms (miliseconds), and stores data indicating a detected result (data indicating presence or absence of the document sheet on the detection region SR) as a set of detection data VDD in the RAM 32. In a case where the 16 number of sets of the detection data VDD have been already stored in the RAM 32 at the detection timing of the current set of detection data VDD, the CPU 30 deletes the oldest set of detection data VDD in the RAM 32 and stores the current set of detection data VDD. When the number of sets of detection data VDD is smaller than 16, the CPU 30 stores the current set of detection data VDD in addition to the already stored sets of detection data VDD in the RAM 32. When the cover sensor 27 is OFF, the CPU 30 ends detection of presence or absence of the document sheet, and thus ends the document detection process. Accordingly, the latest set of detection data VDD obtained when the cover CV is closed is stored in the RAM 32. The document detection process is performed in parallel to the process RA 2 and processes subsequent to RA2.

In RA2 (see FIG. 5) the CPU 30 adjusts the intensity ST of light emitted from the light source 21. Specifically, the CPU 30 controls the light source 21 to turn on in order to irradiate light to the reference member BM, and adjusts the corresponding intensity ST of light for each color so that the analog signal in the AFE 35 become a maximum within the input range of the AFE 35 when light reflected by the reference member BM is read. Here, colors of light emitted from the light source 21 include red, blue, and green.

In RA3 the CPU 30 acquires the first black data BK1 of the reading section 20 as the reference data. Specifically, the CPU 30 controls the light source 21 to turn off and controls the reading section 20 to read the reference member BM. The CPU 30 acquires a set of read digital image data for one color of each pixel in one line as a set of first black data BK1 of the one color of the each pixel in one line. When the cover sensor 27 is ON, the CPU 30 stores a value "1" as the cover state flag CFG in association with the first black data BK1 in the RAM 32. When the cover sensor 27 is OFF, the CPU 30 stores a value "0" as the cover state flag CFG in association with the first black data BK1 in the RAM 32.

In RA4 the CPU 30 acquires the first white data WH1 of the reading section 20 as the reference data. Specifically, the CPU 30 controls the light source 21 to turn on so as to emit light of each color at the corresponding intensity ST adjusted in RA2, and controls the reading section 20 to read the reference member BM. The CPU 30 acquires a set of read digital image data for each color of each pixel in one line as a set of first white data WH1 of the each color of the each pixel in one line. When the cover sensor 27 is ON, the CPU 30 stores a value "1" as the cover state flag CFG in association with the first white data WH1 in the RAM 32. When the cover sensor 27 is OFF, the CPU 30 stores a value "0" as the cover state flag CFG in association with the first white data WH1 in the RAM 32.

In RA5 the CPU 30 moves the reading section 20 by using the drive circuit 37 and acquires the second white data WH2 of the reading section 20 as the reference data. Specifically, the CPU 30 transmits a drive instruction to the drive circuit 37 for moving the reading section 20 so that the reading position of the reading section 20 matches a position shifted in downstream side in the sub scanning direction from the home position HP by 3 mm. The CPU 30 controls the light source 21 to turn on so as to emit light of each color at the corresponding intensity ST adjusted in RA2, and controls the reading section 20 to read the reference member BM. The CPU 30 acquires a set of read digital image data for each color of each pixel in one line as a set of second white data WH2 of the each color of the each pixel in one line. When the cover sensor 27 is ON, the CPU 30 stores a value "1" as the cover state flag CFG in association with the second white data WH2 in the RAM 32. When the cover sensor 27 is OFF, the CPU 30 stores a value "0" as the cover state flag CFG in association with the second white data WH2 in the RAM 32.

In RA6 the CPU 30 acquires the second black data BK2 of the reading section 20 as the reference data. Specifically, the CPU 30 controls the light source 21 to turn off and controls the reading section 20 to read the reference member BM. The CPU 30 acquires a set of read digital image data for one color of each pixel in one line as a set of second black data BK2 of the one color of the each pixel in one line. When the cover sensor 27 is ON, the CPU 30 stores a value "1" as the cover state flag CFG in association with the second black data BK2 in the RAM 32. When the cover sensor 27 is OFF, the CPU 30 stores a value "0" as the cover state flag CFG in association with the second black data BK2 in the RAM 32.

In RA7 the CPU 30 performs a first white black difference data acquisition process for calculating the first white black difference data WBD1. The CPU 30 calculates a first black average BA1 by averaging the sets of first black data BK1 for each pixel in one line. The CPU 30 calculates a second black average BA2 by averaging the sets of second black data BK2 for each pixel in one line. The CPU 30 calculates a black average difference BAD by subtracting the first black average BA1 from the second black average BA2. When the black average difference BAD is smaller than a threshold value TH1, the CPU 30 generates third white data WH3 (described later) based on the first white data WH1 and the second white data WH2, and calculates the first white black difference data WBD1 by subtracting, from a set of third white data WH3 of each pixel, a set of second black data BK2 of a corresponding pixel. When the black average difference BAD is larger than or equal to the threshold value TH1, the CPU 30 calculates second white black difference data WBD2 by subtracting, from a set of first white data WH1 of each pixel, a set of first black data BK1 of a corresponding pixel. The CPU 30 calculates a third white black difference WBD3 by subtracting, from a set of white data WH2 of each pixel, a set second black data BK2 of a corresponding pixel. The CPU 30 generates the first white black difference data WBD1 based on the second white black difference data WBD2 and the third white black difference WBD3. The CPU 30 starts counting the elapsed time ET from a value "0" and stores the first white black difference data WBD1 as the final white black difference data RWBD. Details of the first white black difference data acquisition process will be explained later.

In RA8 the CPU 30 moves the reading section 20 to the detection position DP by using the drive circuit 37. Specifically, the CPU 30 transmits a drive instruction to the drive circuit 37 for moving the reading section 20 so that the reading position of the reading section 20 matches the detection position DP.

First White Black Difference Data Acquisition Process RA7

Figure 6:
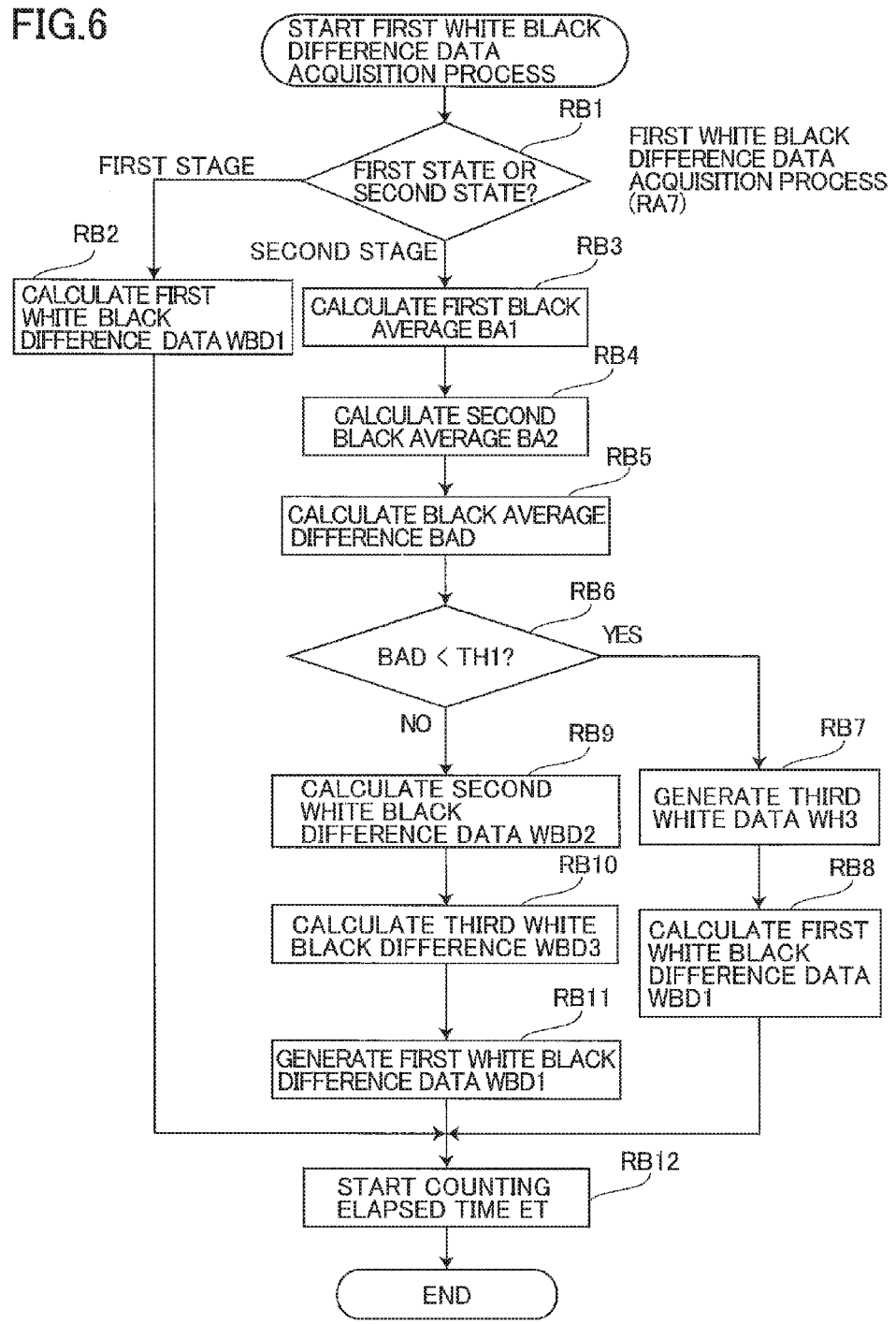
FIG. 6 is a flowchart illustrating a first white black difference data acquisition process.

When the first white black difference data acquisition process (RA7) shown in FIG. 6 starts, in RB1 the CPU 30 determines whether the cover CV was in a first state or a second state when the reference data was acquired. Specifically, when both the cover state flags CFG associated with the second white data WH2 and the second black data BK2 are the value "0", the CPU 30 determines that the cover CV is in the first state, and proceeds to RB2. When at least one of the cover state flags CFG associated with the second white data WH2 and the second black data BK2 are the value "1", the CPU 30 determines that the cover CV is in the second state, and proceeds to RB3. When both the cover state flags CFG associated with the second white data WH2 and the second black data BK2 are the value "0", the second white data WH2 and the second black data BK2 are acquired in a state where the cover CV is closed. In this case, the second white data WH2 and the second black data BK2 are obtained ignoring influence of the ambient light.

When the first state is determined (RB1: first state), in RB2 the CPU 30 calculates first white black difference data WBD1. Specifically, the CPU 30 subtracts, from a set of second white data WH2 of each color of each pixel in one line, a set of second black data BK2 of a corresponding pixel, and stores each calculated result as first white black difference data WBD1 for each color of each pixel in the flash ROM 33.

When the second state is determined (RB1: second state), in RB3 the CPU 30 calculates first black average BA1. Specifically, the CPU 30 calculates the first black average BA1 by averaging the sets of first black data BK1 for each pixel in one line. The CPU 30 stores the first black average BA1 in the RAM 32.

In RB4 the CPU 30 calculates second black average BA2 by averaging the sets of second black data BK2 for each pixel in one line. The CPU 30 stores the second black average BA2 in the RAM 32.

In RB5 the CPU 30 calculates black average difference BAD. Specifically, the CPU 30 calculates the black average difference BAD by subtracting the first black average BA1 from the second black average BA2.

In RB6 the CPU 30 determines whether the black average difference BAD is smaller than a threshold value TH1. Specifically, when the black average difference BAD is smaller than the threshold value TH1 (RB6: YES), the CPU 30 proceeds to RB7. When the black average difference BAD is greater than or equal to the threshold value TH1 (RB6: NO), the CPU 30 proceeds to RB9. In the embodiment, the threshold value TH1 is digital data of 10 bits corresponding to 0.1 V. Generally, a maximum white black output difference between an analog signal of white color and an analog signal of black color is 1.0V. When the maximum difference is 1.0V, a maximum variation amount, which is a difference between a maximum white analog signal and a minimum white analog signal in one line, is 0.5 V. Accordingly, the value "0.1V" is sufficiently small relative to both the maximum white black output difference value "1.0 V" and the maximum variation amount "0.5 V". In this case, influence of variation corresponding to the black average difference BAD are considered little when the black average difference BAD is smaller than the threshold value TH1.

When the black average difference BAD is smaller than the threshold value TH1 (RB6: YES), in RB7 the CPU 30 generates third white data WH3 as reference data. Specifically, the CPU 30 selects largest one of a set of first white data WH1 and a set of second white data WH2 for each color of each pixel in one line, and generates, as a set of third white data WH3 of the each color of the each pixel, the selected one of the first white data WH1 and the second white data WH2 of the each color of the each pixel in one line.

In RB8 the CPU 30 calculates a set of first white black difference data WBD1 for each color of each pixel in one line. Specifically, the CPU 30 calculates a set of first white black difference data WBD1 for each color of each pixel in one line by subtracting, from a set of third white data WH3 of the each color of each pixel in one line, a set of second black data BK2 of a corresponding pixel. The the CPU 30 may calculate a set of first white black difference data WBD1 for each color of each pixel in one line by subtracting, from a set of third white data WH3 of the each color of each pixel in one line, a set of first black data BK1 of a corresponding pixel. The CPU 30 stores the calculated set of first white black difference data WBD1 for each color of each pixel in one line in the flash ROM 33. After completing RB8, the CPU 30 proceeds to RB12.

When the black average difference BAD is larger than or equal to the threshold value TH1 (RB6: NO), in RB9 the CPU 30 calculates a set of second white black difference data WBD2 for each color of each pixel in one line. Specifically, the CPU 30 obtains a set of second white black difference data WBD2 for each color of each pixel in one line by subtracting, from a set of first white data WH1 of the each color of each pixel in one line, a set of first black data BK1 of a corresponding pixel.

In RB10 the CPU 30 calculates a set of third white black difference data WBD3 for each color of each pixel in one line. Specifically, the CPU 30 obtains a set of third white black difference WBD3 for each color of each pixel in one line by subtracting, from a set of second white data WH2 of the each color of each pixel in one line, a set of second black data BK2 of a corresponding pixel.

In RB11 the CPU 30 generates first white black difference data WBD1 for each color of each pixel in one line. Specifically, the CPU 30 selects largest one of a set of second white black difference data WBD2 and a set of third white black difference WBD3 for each color of each pixel in one line, and stores in the flash ROM 33 the selected largest one of the set of second white black difference data WBD2 and the set of third white black difference WBD3 of the each color of the each pixel in one line as the first white black difference data WBD1 of the each color of the each pixel in one line.

In RB12 the CPU 30 starts counting an elapsed time ET from a value "0". The CPU 30 stores in the flash ROM 33 the first white black difference data WBD1 for each color of each pixel in one line as final white black difference data RWBD of the each color of the each pixel. After completing RB12, the first white black difference data acquisition process ends.

Data Reacquisition Processes R7 and R12

Figure 7:
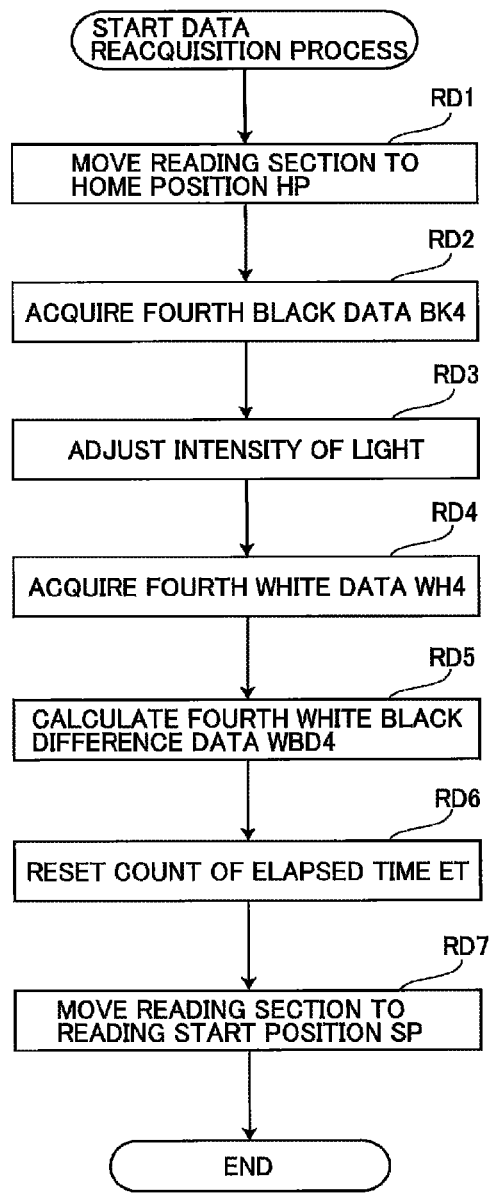
FIG. 7 is a flowchart illustrating a data reacquisition process.

When the data reacquisition process R7 or R12 shown in FIG. 7 is started, in RD1 the CPU 30 controls the reading section 20 to move to the home position HP by using the drive circuit 37. Specifically, the CPU 30 transmits a drive instruction to the drive circuit 37 so that the reading position of the reading section 20 matches the home position HP.

In RD2 the CPU 30 acquires fourth black data BK4 of the reading section 20 as reference data. Specifically, the CPU 30 controls the light source 21 to turn off and controls the reading section 20 to acquire a set of digital image data for one color of each pixel in one line as a set of fourth black data BK4 of the one color of the each pixel in one line.

In RD3 the CPU 30 adjusts the intensity ST of the light source 21. Specifically, similarly to RA2, the CPU 30 controls the light source 21 to turn on in order to irradiate light to the reference member BM, and adjusts the corresponding intensity ST of light for each color so that the analog signal in the AFE, 35 becomes a maximum within the input range of the AFE 35 when light reflected by the reference member BM is read.

In RD4 the CPU 30 acquires fourth white data WH4 as reference data of the reading section 20. Specifically, the CPU 30 controls the light source 21 to emit light at the adjusted intensity ST of each color, and controls the reading section 20 to read the reference member BM. The CPU 30 acquires a set of digital image data for each color of each pixel in one line as a set of fourth white data WH4 of the each color of the each pixel in one line.

In RD5 the CPU 30 calculates fourth white black difference data WBD4 as reference data of the reading section 20. Specifically, the CPU 30 calculates a set of fourth white black difference data WBD4 for each color of each pixel in one line by subtracting, from a set of fourth white data WH4 of the each color of the each pixel in one line, a set of fourth black data BK4 of a corresponding pixel. The CPU 30 stores the calculated set of fourth white black difference data WBD4 for each color of each pixel in one line in the flash ROM 33.

In RD6 the CPU 30 resets count of the elapsed time ET. Specifically, the CPU 30 resets the elapsed time ET to a value "0", and start counting from the value "0". The CPU 30 stores the set of fourth white black difference data WBD4 of each color of each pixel in one line as a set of final white black difference data RWBD of the each color of the each pixel in the flash ROM 33.

In RD7 the CPU 30 controls the reading section 20 to move to the reading start position SP by using the drive circuit 37. Specifically, the CPU 30 transmits a drive instruction to the drive circuit 37 so that the reading position of the reading section 20 matches the reading start position SP. After completing RD7, the data reacquisition process (R7 or R12) ends.

Cases where the User Normally Uses the Image Reader SM

Figure 8:
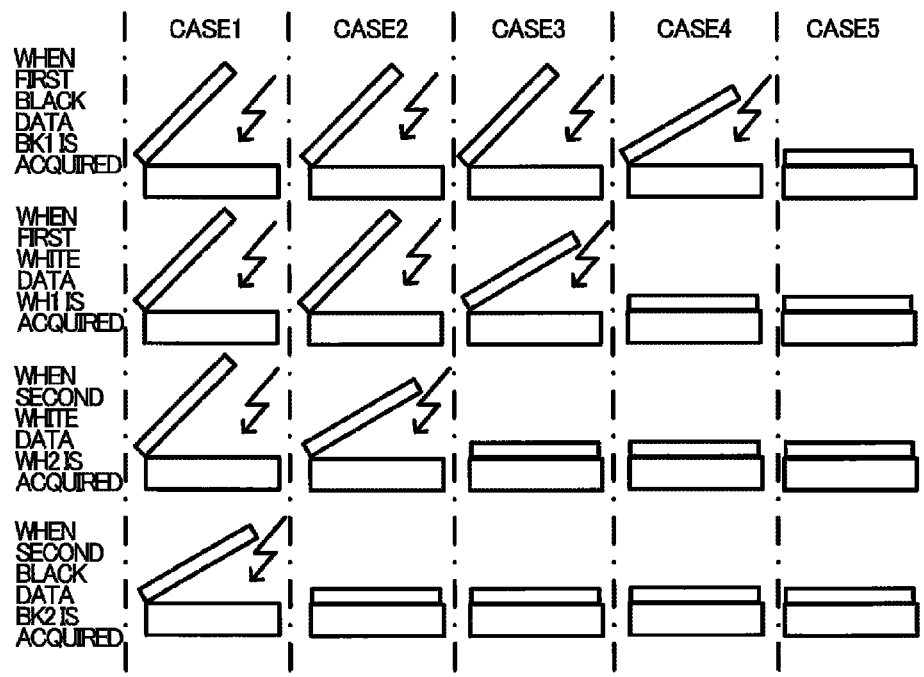
FIG. 8 is an explanatory diagram illustrating Cases 1-5 when a user opens a cover and subsequently closes the cover.

Cases 1-5 will be explained as examples when the user normally uses the image reader SM. Here, meanings of "the user normally uses the image reader SM" are that the user opens the cover CV and subsequently closes the cover CV. FIG. 8 includes a table at upper side and an explanation diagram at lower side that illustrate states of the cover CV for timings when reference data is acquired. Hereinafter, "white data WH" is a general name of the first white data WH1, the second white data WH2, and the third white data WH3, and the fourth white data WH4, and "black data BK" is a general name of the first black data BK1, the second black data BK2, the third black data BK3, and the fourth black data BK4. Similarly, "white black difference data WBD" is a general name of the first white black difference data WBD1, the second white black difference data WBD2, the third white black difference WBD3, and the fourth white black difference data WBD4.

Case 1 indicates that the first black data BK1, the first white data WH1, the second white data WH2, and the second black data BK2 are acquired as reference data when the cover CV is in the open state. In Case 1, all the sets of reference data are influenced by the ambient light. Accordingly, it is required to remove the influence of the ambient light from the acquired data in order to calculate appropriate white black difference data WBD. According to Case 1, in RB1 the second state is determined, and the processes RB6-RB11 are performed for calculating white black difference data WBD with the influence of the ambient light removed. That is, it can be determined whether the influence of the ambient light on the second black data BK2 is changed from that on the first black data BK1 by determining whether the black average difference BAD is smaller than the threshold value TH1 in RB6. The calculating process of white black difference data WBD is changed depending on this determination result. When the influence of the ambient light is not changed, the processes RB7 and RB8 are executed. That is, the third white data WH3, from which power decline caused by reading foreign materials is removed, is generated. Subsequently, the first white black difference data WBD1 is calculated by using the second black data BK2 that is latest black data BK at this time. When the influence of the ambient light is changed, the processes RB9-RB11 are executed. That is, the second white black difference data WBD2 is calculated by using the first black data BK1 and the first white data WH1 that are black data BK and white data acquired at timings close to each other. Similarly, the third white black difference data WBD3 is calculated by using the second black data BK2 and the second white data WH2 that are black data BK and white data WH acquired at timings close to each other. Finally, the first white black difference data WBD1 is generated as largest one of the second white black difference data WBD2 and the third white black difference WBD3. As described later, there are cases where the influence of the ambient light on the white data WH is smaller than that on the black data BK. The influences of the ambient light on the white data WH and the black data BK can be reduced by determining the first white black difference data WBD1 as the largest one of the second white black difference data WBD2 and the third white black difference WBD3. Accordingly, the first white black difference data WBD1 from which the influence of the ambient light is removed can be calculated in Case 1.

Case 2 indicates that the first black data BK1, the first white data WH1, and the second white data WH2 are acquired as reference data when the cover CV is in the open state whereas the second black data BK2 is acquired as reference data when the cover CV is in the closed state. In Case 2, the first black data BK1, the first white data WH1, and the second white data WH2 are influenced by the ambient light. Accordingly, it is required to remove the influence of the ambient light from these data in order to calculate appropriate white black difference data WBD. According to Case 2, similarly to Case 1, in RB1 the second state is determined, and the processes RB6-RB11 are performed for calculating white black difference data WBD with the influence of the ambient light removed. Effects of these processes are the same as Case 1. Accordingly, the first white black difference data WBD1 from which the influence of the ambient light is removed can be calculated in Case 2.

Case 3 indicates that the first black data BK1 and the first white data WH1 are acquired as reference data when the cover CV is in the open state whereas the second white data WH2 and the second black data BK2 are acquired as reference data when the cover CV is in the closed state. In Case 3, the second black data BK2 and the second white data WH2 are not influenced by the ambient light, and thus white black difference data WBD can be calculated using reference data without being influenced by the ambient light. In Case 3, in RB1 the first state is determined, and the first white black difference data WBD1 is calculated using the second black data BK2 and the second white data WH2 that are not influenced by the ambient light as reference data. Accordingly, in Case 3 the first white black difference data WBD1 can be calculated without influence of the ambient light.

Case 4 indicates that the first black data BK1 is acquired as reference data when the cover CV is in the open state whereas the first white data WH1, the second white data WH2, and the second black data BK2 are acquired as reference data when the cover CV is in the closed state. In Case 4, the first white data WH1, the second white data WH2, and the second black data BK2 are not influenced by the ambient light, and thus white black difference data WBD can be calculated using reference data without being influenced by the ambient light. In Case 4, similarly to Case 3, in RB1 the first state is determined, and the first white black difference data WBD1 is calculated using the reference data without being influenced by the ambient light. Accordingly, in Case 4 the first white black difference data WBD1 can be calculated without influence of the ambient light.

Case 5 indicates that the first black data BK1, the first white data WH1, the second white data WH2, and the second black data BK2 are acquired as reference data when the cover CV is in the closed state. In Case 5, all the sets of reference data are not influenced by the ambient light, and thus white black difference data WBD can be calculated using reference data without being influenced by the ambient light. In Case 5, similarly to Case 4, in RB1 the first state is determined, and the first white black difference data WBD1 is calculated using the reference data without being influenced by the ambient light. Accordingly, in Case 5 the first white black difference data WBD1 can be calculated without influence of the ambient light.

As explained above, when the first white data WH1 and the second white data WH2 are obtained under the influence of the ambient light, the second black data BK2 is acquired as black data BK before both the first white data WH1 and the second white data WH2 are acquired as white data WH, and the second black data BK2 is acquired as black data BK immediately after the white data WH (each of the first white data WH1 and second white data WH2) is acquired, whereby the black data BK can be acquired under influence of the ambient light the same degree as the influence of the acquired white data WH. Subtracting the black data BK, which is obtained under the influence of the ambient light, from the white data WH which is also obtained under influence of the ambient light, the white black difference data WBD can be obtained while reducing the influences of the light on the white data WH and the black data BK.

An Example of White Black Difference Data WBD

An example will be explained for a difference in the white black difference data WBD between a case where there is influence of the ambient light and a case where there is no influence of the ambient light while referring to FIGS. 9 and 10. Specifically, explanations will be made for sets of white black difference data WBD of red color for partial pixels in one line from 4671th to 4680th.

As shown in triangles in FIG. 9, values of sets of black data BK without influence of the ambient light are 76, 79, 79, 81, 76, 77, 77, 78, 73, and 77 in an order from 4671th pixel to 4680th pixel. As shown in circles in FIG. 9, values of sets of black data BK with influence of the ambient light are 86, 92, 93, 91, 86, 89, 89, 87, 86, and 87 in the order from 4671th pixel to 4680th pixel.

As shown in x symbols in FIG. 9, values of sets of white data WH for red color without influence of the ambient light are 874, 917, 920, 881, 857, 839, 847, 849, 884, and 882 in the order from 4671th pixel to 4680th pixel. As shown in squares in FIG. 9, values of white data WH for red color with influence of the ambient light are 880, 924, 927, 892, 866, 846, 852, 859, 893, and 889 in the order from 4671th pixel to 4680th pixel.

The white black difference data WBD for red color without the influence of the ambient light is obtained by subtracting the black data BK without the influence of the ambient light from the white data WH for red color without the influence of the ambient light. As shown in squares in FIG. 10, values of sets of white black difference data WBD for red color without the influence of the ambient light are 798, 838, 841, 800, 781, 762, 770, 771, 811, and 805 in the order from 4671th pixel to 4680th pixel.

According to the embodiment, the white black difference data WBD for red color based on the reference data under the influence of the ambient light is obtained by subtracting the black data BK with the influence of the ambient light from the white data WH for red color with the influence of the ambient light. As shown in circles in FIG. 10, values of sets of white black difference data WBD for red color with the influence of the ambient light are 794, 832, 834, 801, 780, 757, 763, 772, 807, and 802 in the order from 4671th pixel to 4680th pixel.

In a conceivable case, the white black difference data WBD for red color with the influence of the ambient light is obtained by subtracting the black data BK without the influence of the ambient light from the white data WH for red color with the influence of the ambient light. This is based on the fact that the black data BK is acquired only when there is no influence of the ambient light in general process. As shown in triangles in FIG. 10, in the conceivable case, values of sets of white black difference data WBD for red color with the influence of the ambient light are 804, 845, 848, 811, 790, 769, 775, 781, 820, and 812 in the order from 4671th pixel to 4680th pixel.

In the example, the values of the sets of white black difference data WBD for the red color based on the reference data obtained under the influence of the ambient light are almost the same as respective values of the sets of white black difference data WBD without the influence of the ambient light for the red color for the 4674th pixel, the 4675th pixel, and the 4678th pixel, whereby the influence of the ambient light can be removed. Here, a first difference is defined as a difference between the set of white black difference data WBD for the red color based on the reference data under the influence of the ambient light according to the embodiment and the set of white black difference data WBD for the red color without influence of the ambient light. A second difference is defined as a difference between the set of white black difference data WBD for the red color based on the reference data under the influence of the ambient light according to the conceivable case and the set of white black difference data WBD for the red color without influence of the ambient light. The first difference is half of the second difference for the 4679th pixel and the 4680th pixel, thereby reducing the influence of the ambient light in the embodiment. Accordingly, sets of white black difference data WBD can be obtained while reducing the influence of the ambient light for half pixels among pixels from 4671th to 4680th.

Advantages

According to the data acquisition process R2 when the cover CV opens, in RA3 the first black data BK1 is acquired, and the first black data BK1 and the cover state flag CFG at a timing of acquisition of the first black data BK1 are stored in association with each other. In RA4 the first white data WH1 is acquired, and the first white data WH1 and the cover state flag CFG at a timing of acquisition of the first white data WH1 are stored in association with each other. In RA5 the second white data WH2 is acquired, and the second white data WH2 and the cover state flag CFG at a timing of acquisition of the second white data WH2 are stored in association with each other. In RA6 the second black data BK2 is acquired, and the second black data BK2 and the cover state flag CFG at a timing of acquisition the second black data BK2 are stored in association with each other. According to the white black difference data acquisition process RA7, in RB1 it is determined whether the a state of the cover CV when acquiring reference data is the first state or the second state. The second state is determined when there is influence of the ambient light on the reference data. In RB3 the first black average BA1 is calculated by averaging all the pixel values of first black data BK1 (or, averaging all the sets of first black data BK1). In RB4 the second black average BA2 is calculated by averaging all the pixel values of second black data BK2 (or, averaging all the sets of second black data BK2). In RB5 the black average difference BAD is calculated by subtracting the first black average BA1 from the second black average BA2. In RB6 it is determined whether the black average difference BAD is smaller than the threshold value TH1. When degree of influence of the ambient light is changed between a timing when the first black data BK1 is acquired and a timing when the second black data BK2 is acquired, it is determined that the black average difference BAD is larger than or equal to the threshold value TH1. In RB9 the second white black difference data WBD2 is calculated by subtracting the first black data BK1 from the first white data WH1. In RB10 the third white black difference WBD3 is calculated by subtracting the second black data BK2 from the second white data WH2. In RB11 the first white black difference data WBD1 is generated as largest one of the set of second white black difference data WBD2 and the set of third white black difference WBD3 for each color of each pixel in one line. Each reference data is associated with a corresponding cover state flag CFG at a timing of acquisition of the each reference data, whereby it can be determined whether each reference data is influenced by the ambient light. Even if reference data is influenced by the ambient light, white black difference data WBD reducing the influence of the ambient light can be obtained by subtracting black data BK with the influence of the ambient light from the white data WH with influence of the ambient light.

Correspondences

The image reader SM, the cover CV, the reference member BM are examples of an image reader, a cover, a white reference member respectively. The reading section 20, the AFE 35, the conveyance motor MT, and the moving mechanism MM are examples of a reading section. The image processor 36, the cover sensor 27, the CPU 30 are examples of a correction section, a detector, and a controller respectively. The process RA3 is an example of a first black data acquisition process. The processes RA4 and RA5 are examples of a white data acquisition process. The processes RB9, RB10, RB11, and RB8 are examples of a correction data calculation process.

The process RA6 is an example of a second black data acquisition process. The process RB3 is an example of a first black average calculation process. The process RB4 is an example of a second black average calculation process. The process RB5 is an example of a black average difference calculation process. The process RB6 is an example of a difference determination process. The operation interface OM is an example of an input section. The process R9 is an example of a third black data acquisition process. The process R14 is an example of a reading process.

Variations

While the disclosure has been described in detail with reference to the above embodiments, it would be apparent to those skilled in the art that various changes and modifications may be made thereto.

(1) The image reader SM may be a multifunctional peripheral having a printing section. Further, in the embodiment, only the single reading section 20 is provided in the image reader SM. However, a plurality of reading sections 20 may be provided in the image reader SM.

(2) The CPU 30 performs the entire main reading process shown in FIG. 4. However, the configuration is not limited to this. For example, the image processor 36, the device controller 34, or the AFE 35 may performs a part of R2-R14 of the main reading process.

(3) In the embodiment, the first white data WH1 and the second white data WH2 are obtained as the white data WH. However, only the first white data WH1 may be obtained and thus the second white data WH2 is not obtained. In this case, the first white data WH1 is used instead of the second white data WH2.

(4) The first state is determined when both the cover state flag CFG associated with the second white data WH2 and the cover state flag CFG associated second black data BK2 are a value "0". The first state may be determined when both two cover state flags CFG associated with one pair indicate a value "0" among any pair selected from one of the white data WH and the black data BK. For example, when two cover state flag CFG associated with a pair of the first white data WH1 and the second black data BK2 indicate a value "0", then the first state is determined.

(5) In the embodiment the third white data WH3 is generated as largest one of the first white data WH1 and the second white data WH2 for each color of each pixel in one line. However, the third white data WH3 may be the first white data WH1 for each pixel. Alternatively, the third white data WH3 may be the second white data WH2 for each pixel.

What is claimed is:

1. An image reader comprising:
 a reading section having a light source and a light receiver, the light receiver including a plurality of light receiving elements arranged in a line extending in a main scanning direction, the plurality of light receiving elements respectively corresponding to a plurality of pixels arranged in the line, the light receiver being configured to read an image piece for the line while the light source emitting light onto a document sheet, the reading section being configured to output a value of each pixel, the value indicating a result of reading the image piece for the line;
 a cover configured to change between a closed state in which the cover covers the reading section and an open state in which the cover does not cover the reading section;
 an image processor configured to perform a shading correction on the value of the each pixel outputted from the reading section;
 a white reference member having a white reference density as a reference of white for the reading section;
 a detector configured to detect whether the cover is in the closed state or the open state;
 a memory; and
 a controller configured to:
 a) acquire a set of first black data for each pixel in the line by reading one line worth of image via the light receiver with the light source being turned off when the detector detects that the cover is in the open state;
 b) acquire, after execution of the acquire a), a set of white data for the each pixel in the line by reading the white reference member via the light receiver with the light source emitting light when the detector detects that the cover is in the open state; and
 c) calculate a set of correction data for the each pixel in the line by subtracting the set of first black data of the each pixel from the set of first white data of the each pixel, where the set of correction data is used in the shading correction.

2. The image reader according to claim 1, wherein the controller is further configured to:
 d) acquire, after execution of the acquire b), a set of second black data for the each pixel in the line by reading one line worth of image via the light receiver with the light source being turned off when the detector detects that the cover is in the open state;
 e) calculate a first black average value by averaging the plurality of sets of first black data for the plurality of pixels in the line;
 f) calculate a second black average value by averaging the plurality of sets of second black data for the plurality of pixels in the line;
 g) calculate a black average difference value by subtracting the first black average value from the second black average value; and
 h) determine whether the black average difference value is smaller than a threshold value,
 wherein the calculate c) includes:
 c-1) calculate the set of correction data for the each pixel in the line by subtracting, from a set of white data of the each pixel, selected one of a set of first black data of the each pixel and a set of second black data of the each pixel when the black average difference value is smaller than the threshold value;

c-2) calculate a first black/white difference value for the each pixel in the line by subtracting a set of first black data of the each pixel in the line from the set of white data of the each pixel when the black average difference value is larger than or equal to the threshold value;

c-3) calculate a second black/white difference value for the each pixel in the line by subtracting a set of second black data of the each pixel from the set of white data of the each pixel when the black average difference value is larger than or equal to the threshold value; and c-4) set the set of correction data for the each pixel to largest one of the set of first black/white difference value of the each pixel and the set of second black/white difference value of the each pixel when the black average difference value is larger than or equal to the threshold value.

3. The image reader according to claim 2, wherein the reading section is configured to read each pixel in the line while the reading section moves in a sub scanning direction orthogonal to the main scanning direction, wherein the acquire b) includes:

b-1) acquire, after execution of the acquire a), a set of first white data for the each pixel in the line by reading the reference member via the light receiver with the light source emitting light when the detector detects that the cover is in the open state; and b-2) acquire, after execution of the acquire b-1), a set of second white data for the each pixel in the line by moving the reading section to a position shifted in a prescribed distance in the sub scanning direction from a position of the reading section where the acquire b-1) is executed, and by reading the reference member via the light receiver with the light source emitting light when the detector detects that the cover is in the open state, wherein the calculate c-2) calculates the first black/white difference value for the each pixel in the line by subtracting the set of first black data of the each pixel in the line from the set of first white data of the each pixel when the black average difference value is larger than or equal to the threshold value;

wherein the calculate c-3) calculates the second black/white difference value for the each pixel in the line by subtracting the set of second black data of the each pixel in the line from the set of second white data of the each pixel when the black average difference value is larger than or equal to the threshold value.

4. The image reader according to claim 3, wherein the calculate c-1) generates a set of third white data for the each pixel in the line to be largest one of the set of first white data of the each pixel and the set of second white data of the each pixel, and calculates the set of correction data for the each pixel in the line by subtracting, from the set of third white data of the each pixel, the set of second black data of the each pixel when the black average difference value is smaller than the threshold value.

5. The image reader according to claim 4, further comprising an operation interface, wherein the shading correction includes a black correction and a white correction, wherein the controller is further configured to:

i) acquire a set of third black data for each pixel in the line by reading a one line worth of image via the light receiver with the light source being turned off when the detector detects that the cover is in the closed state;

j) control, in response to a reading instruction received by the operation interface, the reading section to output a pixel value of the each pixel, and control the image processor to perform the black correction on the pixel value of the each pixel by using the set of third black data of the each pixel, and to perform the white correction on a black-correction-performed pixel value of the each pixel by using the set of correction data of the each pixel.

6. An image reader comprising:

a reading section having a light source and a light receiver, the light receiver including a plurality of light receiving elements arranged in a line extending in a main scanning direction, each light receiving element being configured to output a value based on received light;

a cover movable between a closed state and an open state;

a white reference member;

a cover detector configured to detect whether the cover is in the closed state or the open state;

an image processor having shading correction function;

a memory; and a controller configured to:

a) while the cover detector detects that the cover is in the open state, receive a first black value from each light receiving element without emitting light from the light source;

b) determine a set of first black data for each light receiving element based on the received first black value received from the each light receiving element;

c) after determining the set of first black data, receive first white value from each light receiving element while emitting light from the light source at a first position and while the cover detector detects that the cover is in the open state;

d) determine a set of first white data for each light receiving element based on the received first white value from each light receiving element;

e) determine a set of correction data for each light receiving element by subtracting the set of first black data of the each light receiving element from the set of first white data of the each light receiving element; and f) control the image processor to perform the shading correction function using the set of correction data.

7. The image reader according to claim 6, wherein the controller is further configured to:

g) after d), receive a second black value from each light receiving element without emitting light from the light source while the cover detector detects that the cover is in the open state;

h) determine a set of second black data for each light receiving element based on the received second black value from the each light receiving element;

i) determine a first black average value that is an average of the sets of the first black data for the plurality of light receiving elements;

j) determine a second black average value that is an average of the sets of the second black data for the plurality of light receiving elements;

k) determine a black average difference value by subtracting the first black average value from the second black average value; and l) determine whether the black average difference value is less than a threshold value, wherein the set of correction data is determined in e) in a manner of the following one of e1) and e2):

e1) if it is determined in l) that the black average difference value is less than a threshold value, determine the set of correction data for each light receiving element by subtracting one of the set of first black data of the each light receiving element and the set of the second black data of the each light receiving element from the set of first white data of the each light receiving element;

e2) if it is determined in l) that the black average difference value is not less than a threshold value, e2a) determine a first black/white difference value for each light receiving element by subtracting the set of first black data of the each light receiving element from the set of first white data of the each light receiving element;

e2b) determine a second black/white difference value for each light receiving element by subtracting the set of second black data of the each light receiving element from the set of first white data of the each light receiving element;

e2c) determine a largest value for each light receiving element among the first black/white difference value of the each light receiving element and the second black/white difference value of the each light receiving element; and e2d) determine the set of correction data based on the determined largest value.

8. The image reader according to claim 7, wherein the light emitter is configured to emit light while the reading section moves in a sub scanning direction orthogonal to the main scanning direction, and the controller is further configured to:

m) after d), receive a second white value from each light receiving element while emitting light from the light source at a second position that is shifted from the first position by a prescribed distance in the sub scanning direction and while the cover detector detects that the cover is in the open state, wherein the second black/white difference value is determined in e2b) by subtracting the set of second black data of the each light receiving element from the set of second white data of the each light receiving element.

9. The image reader according to claim 8, wherein the controller is further configured to:

n) determine a set of third white data for each receiving element that is a largest one among the first white data of the each receiving element and the second white data of the each light receiving element, wherein the set of correction data for each light receiving element is determined in e1) by subtracting the set of the second black data of the each light receiving element from the set of third white data of the each light receiving element.

\* \* \* \* \*